US012549336B2

(12) United States Patent
Jobard et al.

(10) Patent No.: US 12,549,336 B2
(45) Date of Patent: Feb. 10, 2026

(54) METHODS AND DEVICES FOR AUTHENTICATION

(71) Applicant: Metal Gear, Sceaux (FR)

(72) Inventors: Alois Jobard, Sceaux (FR); Alexandre Bossard, Issy-les-Moulineaux (FR); Théo Delrieu, Puteaux (FR); Philippe Daouadi, Nogent-sur-Marne (FR); Jeremy Tellaa, Lyons (FR)

(73) Assignee: Metal Gear, Sceaux (FR)

( * ) Notice: Subject to any disclaimer, the term of this patent is extended or adjusted under 35 U.S.C. 154(b) by 142 days.

(21) Appl. No.: 18/503,944

(22) Filed: Nov. 7, 2023

(65) Prior Publication Data
US 2024/0171380 A1    May 23, 2024

(30) Foreign Application Priority Data
Nov. 18, 2022    (EP) .................................... 22306706

(51) Int. Cl.
*H04L 9/40* (2022.01)
*H04L 9/08* (2006.01)
*H04L 9/32* (2006.01)

(52) U.S. Cl.
CPC ............ *H04L 9/0825* (2013.01); *H04L 9/085* (2013.01); *H04L 9/3271* (2013.01)

(58) Field of Classification Search
CPC ... H04L 9/085; H04L 9/3271; H04L 63/0853; H04L 63/0869; G06F 21/44; G06F 21/6272; G06F 2221/2103; G06F 2221/2115
See application file for complete search history.

(56) References Cited

U.S. PATENT DOCUMENTS

| 8,719,952 | B1 | 5/2014 | Damm-Goossens | |
|---|---|---|---|---|
| 10,362,022 | B2 * | 7/2019 | Heimlicher | H04L 9/3271 |
| 2008/0222696 | A1 * | 9/2008 | Nicodemus | H04L 63/102 |
| | | | | 726/1 |
| 2010/0299313 | A1 | 11/2010 | Orsini et al. | |
| 2022/0215384 | A1 * | 7/2022 | Livingston | G06Q 20/401 |

OTHER PUBLICATIONS

Foreign Communication from a Related Counterpart Application, Extended European Search Report dated Apr. 25, 2023, European Application No. 22306706.7.
Dierks, et al., "The Transport Layer Security (TLS) Protocol Version 1.2", Network Working Group Request for Comments: 5246, Obsoletes: 3268, 4346, 4366, Updates: 4492, Category: Standards Track, Aug. 2008, 104 pages.

* cited by examiner

*Primary Examiner* — Thaddeus J Plecha
(74) *Attorney, Agent, or Firm* — Conley Rose, P.C.

(57) ABSTRACT

A method carried out by a first device includes initiating an authentication session for authenticating a user of the first device with N second devices and with a third device, obtaining an asymmetric key pair comprising a public key and a private key, obtaining an identifier for the authentication session from the third device, transmitting the identifier and the public key to the second devices, receiving first data from the user and carrying out user authentication with the third device based on the first data, obtaining a respective challenge from each of the second devices, for each challenge, signing the challenge with the private key and sending the signed challenge to the respective second device the challenge was received from, receiving a message indicative of successful user authentication from each second device.

21 Claims, 9 Drawing Sheets

METHODS AND DEVICES FOR AUTHENTICATION

CROSS REFERENCE TO RELATED APPLICATION

The present application claims priority to European Patent application No. 22306706.7 filed on Nov. 18, 2022 with the European Patent Office, the entire disclosure of which is incorporated herein by reference.

TECHNICAL FIELD

Methods and devices for authentication are described. The methods and devices are particularly but not only adapted for use in data storage and retrieval in various fields, such as for example cryptography.

BACKGROUND

The need for the secure storage of data, be it of arbitrary nature or not, is pervasive. In cryptographical applications for example, there is a need to securely store private keys, or data such as recovery phrases or seeds, from which the private keys can then be derived.

Authentication is generally a prerequisite to any storage operation. However, known systems either rely on keys or passwords kept by the user, which are not optimal in terms of user experience, or implies a high risk of fraud by some or all parts of the system.

It is desirable to provide a solution for authentication which reduces the possibility of fraud, enabling secure storage of sensitive data without relying on user-kept keys or passwords.

SUMMARY

A first aspect concerns a method carried out by a first device comprising a processor and memory, said method comprising:
- initiating an authentication session for authenticating a user of the first device with N second devices and with a third device, with N being an integer greater than 0;
- obtaining an asymmetric key pair comprising a public key and a private key;
- obtaining an identifier for the authentication session from the third device, wherein the identifier is unique to the authentication session;
- transmitting the identifier and the public key to the second devices;
- if a message is received from any second device indicating this second device received, in the past, an identifier identical to the identifier for the authentication session, aborting the authentication session; else receiving first data from the user and carrying out user authentication with the third device based on the first data;
- if user authentication fails, aborting the authentication session; else obtaining a respective challenge from each of the second devices;
- for each challenge, signing the challenge with the private key and sending the signed challenge to the respective second device the challenge was received from;
- if a message is received from any of the second devices indicating that a challenge failed, aborting the authentication session; else receiving a message indicative of successful user authentication from each second device, indicative of a check by each second device of successful authentication of the user by the third device for the authentication session corresponding to the session identifier.

Using a unique authentication session identifier for an authentication session with a plurality of devices seeking to authenticate a user as indicated above allows a device through which a user authenticates to lock the session with those devices which seek to authenticate the user, preventing other devices from impersonating the first device.

According to one or more embodiments, the first data is characteristic of the user's identity and authentication by the first device comprises a check of the user's identity.

According to one or more embodiments, the method is such that:
- obtaining a challenge comprises obtaining the challenge unencrypted and encrypted by the respective second device, and
- signing the challenge comprises signing the unencrypted challenge; and
- sending the signed challenge also comprises sending the encrypted challenge to the respective second device.

According to one or more embodiments, in the above method, each challenge comprises a randomly generated nonce and an identifier of the second device that generated the challenge, method further comprising determining that the identifier in the challenge matches an identifier of the second device that the challenge was requested from, and in the negative, aborting the authentication session.

According to one or more embodiments, the method further comprises carrying out user authentication with a fourth device, and in case of successful user authentication, obtaining, from the fourth device, a key enabling encryption of second data.

According to one or more embodiments, wherein $N>=2$, the method further comprises
- obtaining the second data, wherein the second data is to be stored on the second devices;
- splitting the second data into N shares by carrying out a secret sharing method;
- encrypting each share with the key enabling encryption obtained from the fourth device; and
- sending each of the N encrypted shares to a respective second device for storage.

Accordingly, the proposed solution is non-custodial in the sense that the data to be securely stored is not kept by a single entity in the system, nor can it be accessed by any single entity in the system other than a user controlled device. Moreover, the system is resilient when one or more devices storing parts of the data cannot be reached.

According to one or more embodiments, wherein $N>=2$, the method further comprises
- transmitting the key enabling encryption to a fifth device, wherein the fifth device is removably connected to the first device;
- receiving from the fifth device N shares of data encrypted with the key enabling encryption and encrypted with an additional key stored in the fifth device;
- sending each of the N encrypted shares to a respective second device for storage.

According to one or more embodiments, the method further comprises
- carrying out user authentication with a fourth device, and in case of successful user authentication, obtaining, from the fourth device, a decryption key;
- obtaining M encrypted shares from M second devices, wherein M is an integer such as $1<=M<=N$, wherein the shares resulted from the application of a secret sharing method to second data and M shares are sufficient to recover the second data, and wherein the decryption key is adapted to decrypt the M encrypted shares;

decrypting the M shares;

applying a reverse secret sharing method to combine the M decrypted shares to form second data.

According to one or more embodiments, the method further comprises carrying out user authentication with a fourth device, and in case of successful user authentication, obtaining a decryption key from the fourth device;

transmitting the decryption key to a fifth device, wherein the fifth device is removably connected to the first device;

obtaining from M second devices respective twice encrypted shares of data requiring for decryption both the decryption key and an additional key stored in the fifth device, wherein the shares of data are representative of second data to which a secret sharing method was applied, wherein M is an integer such as $1<=M<=N$;

sending the M twice encrypted shares to the fifth device.

A second aspect concerns a first device comprising a processor and memory, said memory storing program code, the processor when executing the code causing the device to perform a method as defined above.

A third aspect concerns method carried out by a second device comprising a processor and memory, said method comprising:

receiving an authentication session identifier and a public key from a first device, wherein the session identifier identifies an authentication session of a user of the first device a third device;

determining the authentication session identifier was previously received, and in the affirmative, sending to the first device a message indicative of the fact that the session identifier was previously received, and in the negative:

storing said session identifier and public key in the memory;

receiving a request for a challenge from the first device;

sending a message containing a challenge in response to the request;

receiving a response to the challenge from the first device and verifying the response, wherein the response contains the challenge signed with a private key of the first device corresponding to the public key and the verification comprises determining that the signature of the challenge was made by the first device using the public key, in the negative, sending to the first device an error message indicative of an incorrect response to the challenge; and when the verification is positive, obtaining, from the third device and as a function of the session identifier, a result of an authentication process of the user by the third device; and in case the result is indicative of a successful authentication of the user by the third device for the authentication session corresponding to the session identifier, considering the user also authenticated by the second device; and sending a message of successful authentication to the first device.

Accordingly, a single authentication of the user, such as a single user identity verification made by the third device can be used to authenticate a user with all second devices.

According to one or more embodiments, the method further comprises encrypting the challenge with a secret key of the second device to form encrypted data;

sending the challenge and the encrypted data in the challenge message;

receiving the signed challenge and the encrypted data in the challenge response; wherein the verification comprises decrypting the encrypted data; and carrying out the determination that the signature of the challenge was made by the first device based on the signed challenge, the public key and the decrypted challenge.

According to one or more embodiments, the method further comprises generating a timestamp;

encrypting the timestamp with the challenge to form encrypted data;

sending the challenge and the encrypted data;

receiving the signed challenge and the encrypted data in the challenge response; wherein the verification comprises decrypting the encrypted data;

determining that the challenge is valid as a function of the timestamp, and if the determination is negative, sending to the first device an error message indicative of the expiration of the challenge.

According to one or more embodiments, the verification comprises determining whether the encrypted data can be decrypted, and in the negative, sending a corresponding error message to the first device.

According to one or more embodiments, the method comprises receiving an authentication session identifier in the challenge response;

the verification comprising determining whether a public key stored by the second device was received with the session identifier in the challenge response; and in the negative, sending to the first device an error message indicative of an incorrect authentication session identifier.

According to one or more embodiments, the second device stores the challenge in memory and the verification comprises determining that the signature of the challenge was made by the first device based on the signed challenge, the public key and the stored challenge.

According to one or more embodiments, obtaining the result of the authentication comprises obtaining data characteristic of the user's identity.

According to one or more embodiments, the challenge comprises a randomly generated nonce and a unique identifier of the second device.

A fourth aspect concerns a second device comprising a processor and memory, said memory storing program code, the processor when executing the code causing the device to perform a method as defined above.

A fifth aspect concerns non-transitory computer readable medium comprising program instructions stored thereon for performing the method carried out by the first device.

A sixth aspect concerns a non-transitory computer readable medium comprising program instructions stored thereon for performing the method carried out by the second device.

BRIEF DESCRIPTION OF THE DRAWINGS

Example embodiments will be more fully understood from the detailed description provided herein and the accompanying drawings, which are given by way of illustration only.

DETAILED DESCRIPTION

Figure 1:
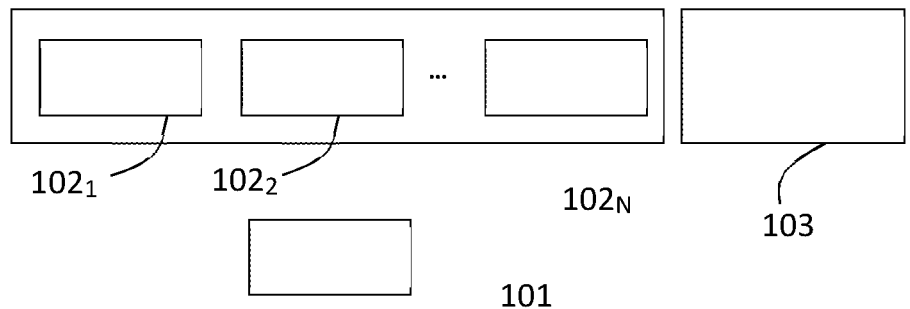
FIG. 1 is a schematic representation of a system according to one or more exemplary embodiments.

Various exemplary embodiments will now be described more fully with reference to the accompanying drawings. However, specific structural and functional details disclosed herein are merely representative for purposes of describing example embodiments. The exemplary embodiments may be embodied in many alternate forms and should not be construed as limited to only the embodiments set forth herein. It should be understood that there is no intent to limit example embodiments to the particular forms disclosed.

It should be appreciated by those skilled in the art that any functions, engines, block diagrams, flow diagrams, state transition diagrams, message sequence charts and/or flowcharts herein represent conceptual views of illustrative circuitry embodying the principles of the exemplary embodiments. Functions, actions or steps described herein can be implemented in hardware or software or any combination thereof, and ordering of these functions, actions or steps may be different from that presented. If implemented in software, the functions, blocks of the block diagrams and/or flowchart illustrations can be implemented e.g. using software code executed by a processor or a processing device.

In the present description, functional blocks denoted as "means configured to perform . . . " a certain function are to be understood as functional blocks comprising circuitry that is adapted for performing or configured to perform a certain function. Moreover, any entity described herein as "means", may be implemented as one or more distinct entities or within an entity providing additional functions. When provided by a processor, the functions may be provided by a single processor or several processors. Moreover, the term "processor" includes one or more of a digital signal processor, remote processor, graphical processing units ('GPUs'), dedicated or generic circuitry, read only memory for storing software, random access memory, and non-volatile storage.

According to one or more exemplary embodiments, a system and its component devices allowing secure storage of data and implementing an innovative authentication method are described. Accordingly, as described in detail below, one or more of the component devices of the system perform (a) an authentication method for authenticating a user with a plurality of devices and (b) data storage and retrieval methods involving the plurality of storage devices and relying on the authentication method according to (a).

I. Authentication

One or more embodiments concern a shared user authentication method where a single user identity verification made by a third party device is used to authenticate a user, through a user device, with several independent parties, represented by respective devices, which do not necessarily trust each other.

Independent authentication of the user by each party is thus avoided. Indeed, real-life identity verification is a very involved mechanism for the user and repeating it once for each independent party is not efficient.

FIG. 1 is a schematic diagram of a system implementing the authentication method according to a first embodiment. The system comprises a first device 101, N second devices 102$x$ and an authentication server 103. N is any integer greater than 0 with regard to the authentication method. In the frame of a system implementing a secret sharing algorithm, N will be taken greater or equal to 2.

Device 101 comprises a local data storage capability, communication means configured to enable communication with the other devices of the system (e.g. over the internet) and processing means for performing cryptographic operations (such as e.g. symmetric and asymmetric encryption, signature and signature verification, random number generation, secure hashing) and possesses network communication functionalities at least allowing communication.

Devices 102$x$ comprise a long-term storage capability, communication means configured to enable communication with the other devices of the system (e.g. over the internet) and processing means for performing cryptographic operations. Within the frame of the present embodiment, devices 102$x$ seek to independently authenticate device 101.

Server 103 provides a third-party authentication service. Within the frame of the present embodiment server 103 provides among other things a unique authentication session identifier ('Session ID') for each authentication session. The session ID is also immutable in the sense that it remains the same for a given authentication session.

Device 101 is a device under control of a user, who is a physical person. For example, device 101 may be a personal computer, a smart phone or any other device with appropriate connectivity, processing and storage means. Device 101 is configured to allow a user to trigger the authentication, storage and retrieval methods described herein.

Devices 102$x$ are the devices which are used for storage of the data to be securely stored. For that purpose, the devices 102$x$ individually authenticate device 101. According to one or more embodiments, addresses of the devices 102$x$ are stored (e.g. hard-coded) in device 101, but other solutions for determining these addresses may be used.

An authentication method according to one or more embodiments will now be described. According to the authentication method described herein, a single authentication instance is shared among an arbitrary number N of devices 102$x$. The authentication method described prevents any of the devices 102$x$ from impersonating the user.

In what follows, a cryptographical application will be used as a non-limiting example. The data to be stored may typically comprise one or more private keys or one or more seeds or mnemonic phrases allowing key recovery. Other types of data may be considered for storing and retrieving according to the methods described herein.

The authentication process according to the present embodiment relies on the use of asymmetric signatures and a series of exchanges between the user's device 101 and devices 102x to prevent any of the latter to act as device 101 during authentication.

In a first step, an exchange between device 101 and devices 102x aims at implementing an authentication session locking mechanism based on the session identifier. The purpose of the locking mechanism is twofold—it allows both the user device 101 and the storage devices 102x to spot fraud attempts from other devices trying to use the same session ID. To lock the session ID, it is sent alongside a public key of an asymmetric signature key pair provided by user device 101 to each of the devices 102x before the authentication per se takes place. It is the public key that allows distinguishing between the legitimate device 101 and any other device.

- If a first device 102x receives a locking attempt where the session ID is already locked (i.e. the device 102x received the same session ID previously), the locking attempt is rejected by the corresponding device 102x. This can happen when a second device 102x attempts to lock the session ID in place of device 101.
- If a first device 102x locks the session ID with a second device 102x before the user device 101 does so for a same session ID, the user device 101 will receive an error message from the second device 102x when trying to lock the session with that second device.

The devices 102x thus cannot use the session ID to impersonate the user.

According to the present embodiment, the user device 101 will abort the authentication process completely if it receives at least one error message as above.

According to the present embodiment, the session ID and public key are stored by the storage devices 102x to prevent a re-locking of a session by another device based on the same session ID.

After the session ID has been successfully locked with all devices 102x, the user can authenticate with the authentication server 103 through device 101. Carrying out user authentication with the authentication server only after the session ID has been locked with all devices 102x prevents any of the devices 102x to use the session ID they received to impersonate the user, since authentication with the authentication server has not yet taken place.

A second step guarantees to each device 102x that the authentication is finished on the same device 101 that performed the session ID locking.

To prove to each device 102x that the authentication was finished on the same user device 101 as the one which locked the session ID, the private signature key is used by the user device 101 to sign a respective challenge provided by each device 102x. Knowing the public key of the user device 101, a device 102x can verify that the signed challenge was indeed sent by the user device 101 by checking that the signature of the challenge. If the check is not positive, the device 102x can conclude that it received a signed challenge from a device other than the legitimate user device 101.

According to the present embodiment, a challenge includes:
- A randomly-generated nonce The nonce is renewed for every challenge sent by a storage device 102x, preventing reuse of a signed challenge (also referred to as 'signature').
- An identifier of the device generating the challenge.

The identifier of a device 102x is fixed and is communicated to the device 101. This helps prevent an oracle attack such as a first device 102x asking another device 102x for a challenge and asking the user device 101 to sign it.
- A timestamp can optionally be associated with the challenge.

A timestamp, e.g. of the challenge generation time, allows limiting the validity of the challenge in time in various ways.

The authentication of the user by a storage device 102x comprises sending, by the storage device 102x, a challenge message to the user device, this message containing the challenge to which the user device 101 responds. Based on this response, the storage device 102x having sent the challenge message carries out a verification and as a result of this verification, authenticates or does not authenticate the user.

Each challenge is encrypted with a predefined storage device key by the storage device that generated it. The encryption key is specific to each storage device. The encrypted challenge will also be referred to as 'cookie' in what follows. When a timestamp is present, it can also be encrypted along with the challenge and included within the 'cookie'.

The cookie is transmitted to the user device alongside a clear (i.e. non-encrypted) version of the challenge.

The user device then sends back a challenge response to the storage device that sent the challenge. According to the present embodiment, the challenge response includes:
- The unencrypted challenge to the storage device, signed with the user device's private key of the asymmetric key pair.
- The cookie.

A storage device can decrypt the cookie with its own storage device key, in order to obtain an untampered challenge, and then check that the signature provided by the user device matches the contents of the challenge with the help of the public key, as well known to the person skilled in the art.

The challenges themselves thus do not need to be stored by the respective storage devices which generated them. This advantageously limits required storage resources on the side of the storage devices 102x.

For the purpose of a more detailed explanation of the authentication method according to the present embodiment, the authentication is presented, solely for the clarity of the description, according to three phases, comprising an initialization phase, a registration phase and a verification phase.

Figure 2:
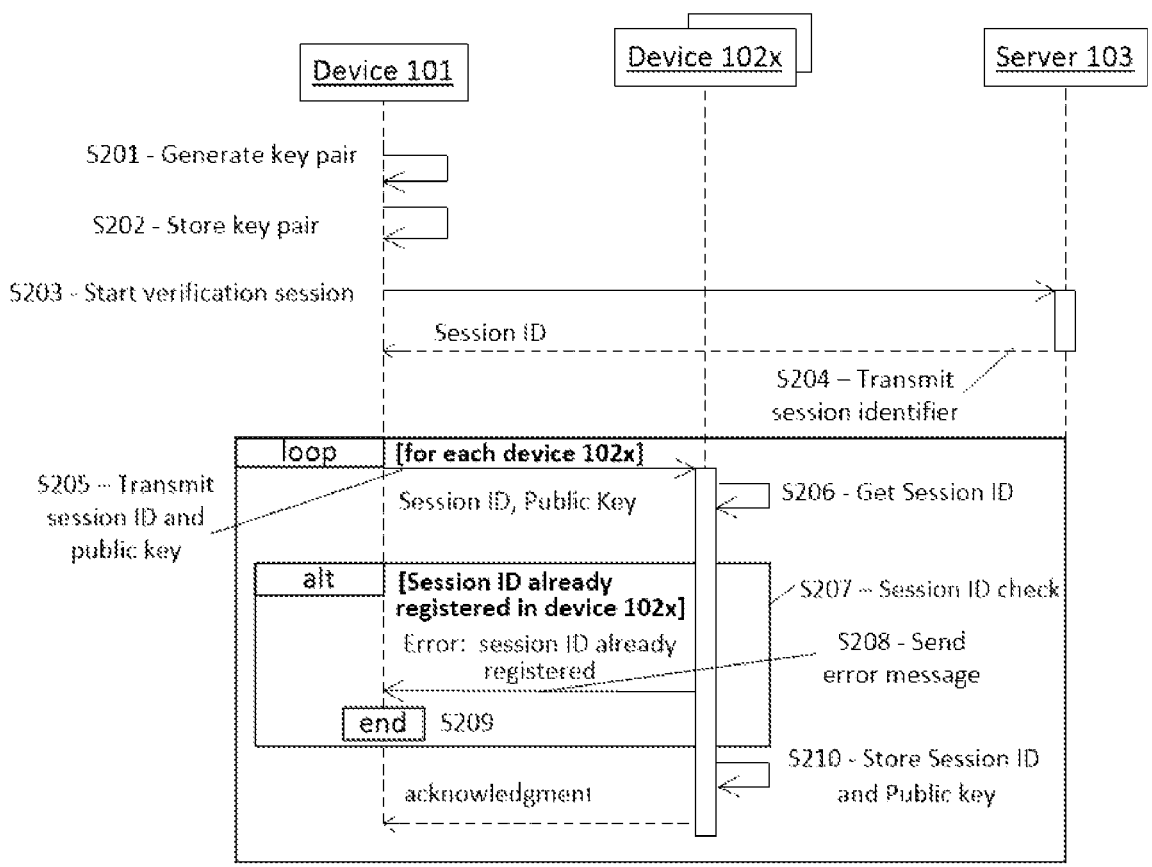
FIG. 2 is a message sequence chart of a first part of an authentication method according to one or more exemplary embodiments.
Figure 3A:
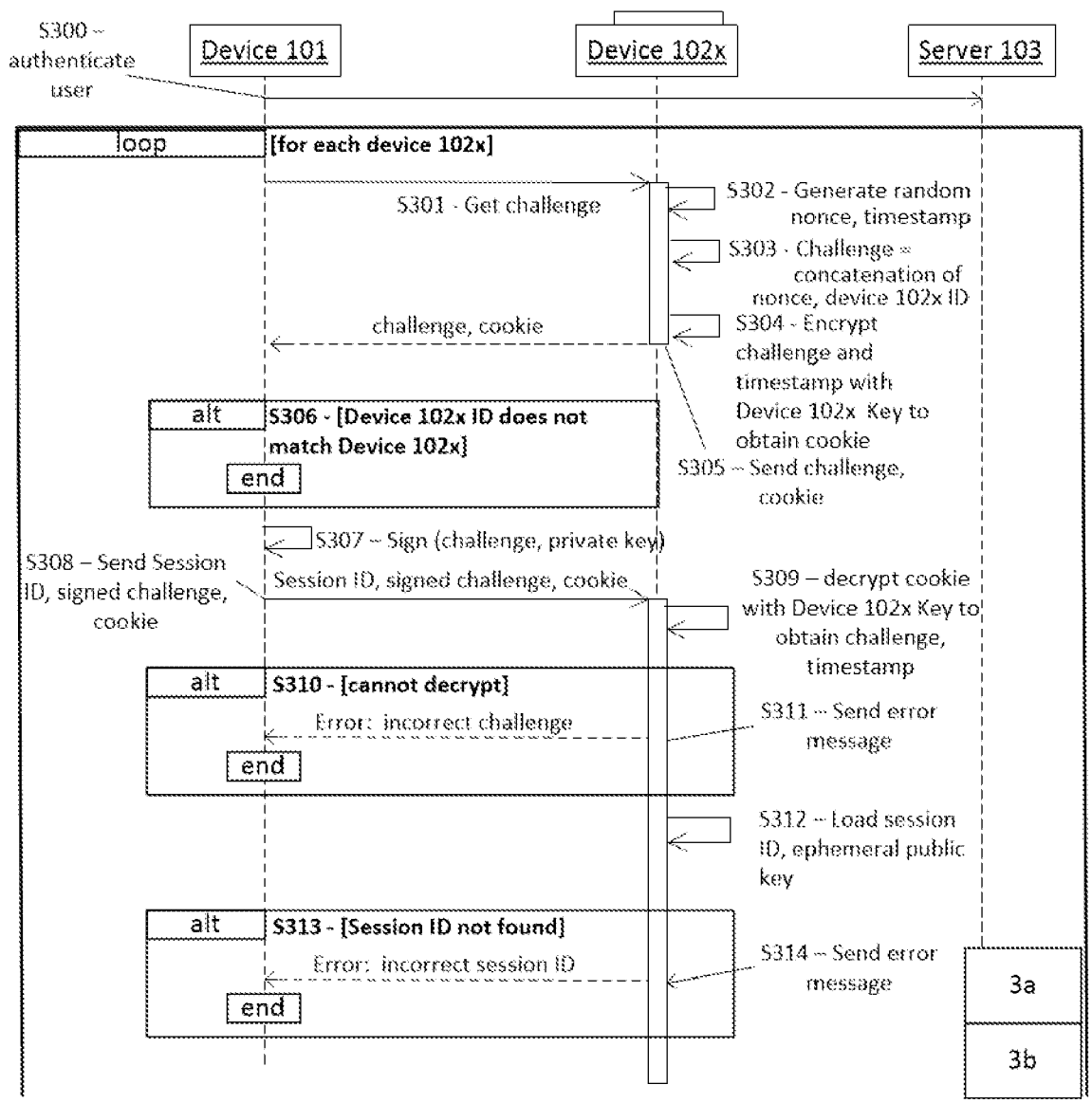
FIG. 3a and FIG. 3b are message sequence charts which combined form a second part of the authentication method according to one or more exemplary embodiments.
Figure 3B:
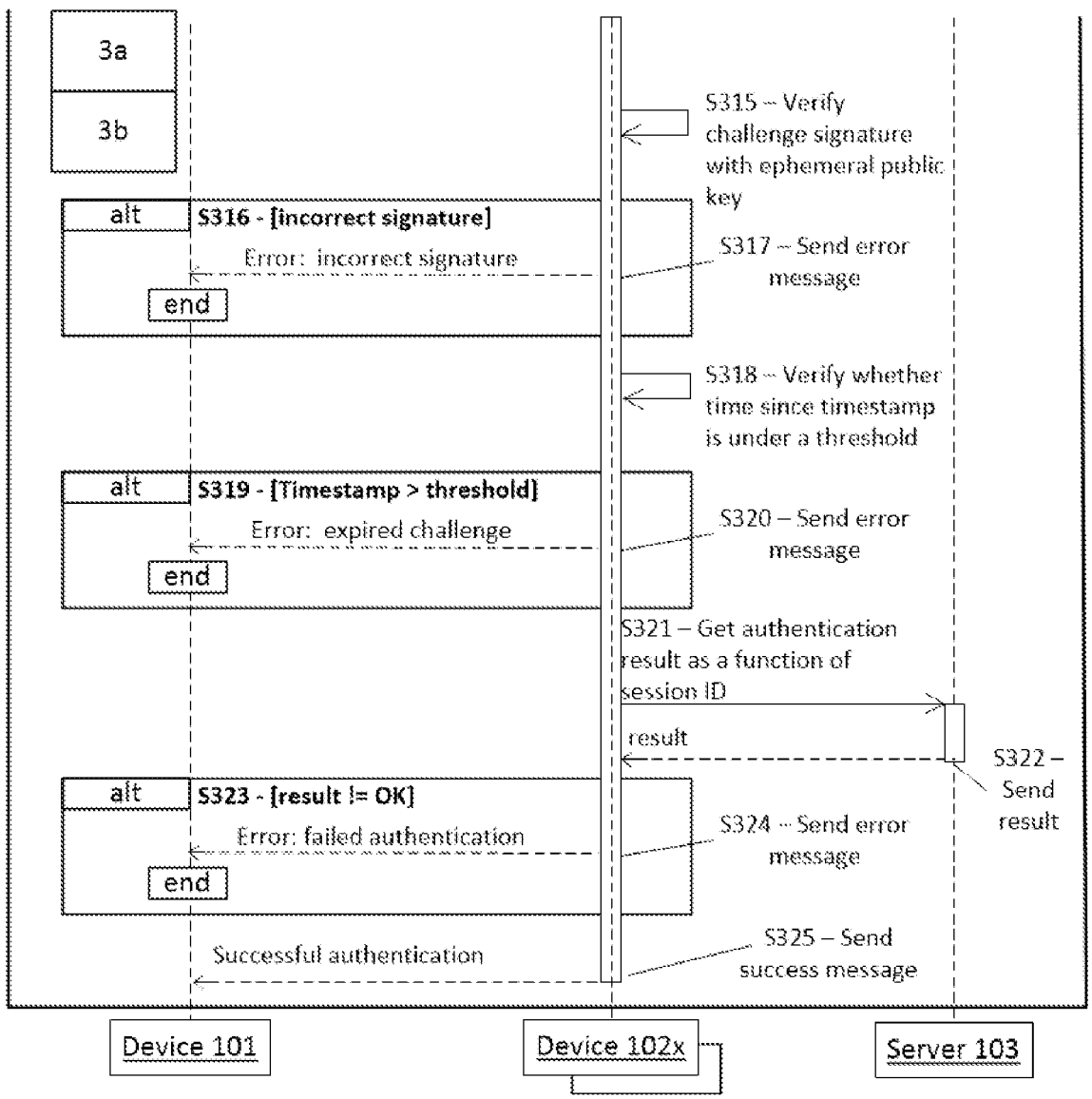

FIG. 2 is a message sequence diagram that shows the initialization and registration phases as carried out between the user device 101, the devices 102x and the authentication server 103. FIG. 3a and FIG. 3b show the verification phase.

The initialization phase is as follows:
- The device 101 generates an asymmetric key pair and stores it locally (S201, S202). The key pair is for example generated randomly.
- A request for starting a new authentication session is sent by device 101 to authentication server 103 (S203)—the latter generates a corresponding session ID and transmits it (S204) to the device 101.

The registration phase is carried out for each of the storage devices 102x that need to authenticate the user and is as follows for a given storage device 102x:
- The device 101 transmits (S205) the session ID and its public key to the given storage device.
- The given storage device extracts the session ID (S206) and carries out a check (S207) as to whether this session ID is already stored. If the session ID is already stored by the given storage device, then the given storage device sends a corresponding error message (S209). The check then ends at S209. Else, the session ID and the public key are stored (S210).

The verification phase is carried out for each of the storage devices 102x that need to authenticate the user and is as follows for a given storage device 102x:

- The user device carries out message exchanges (summarized at S300) required to authenticate the user with the third-party authentication server 103. According to one or more embodiments, this authentication can comprise a verification by the authentication server of the user's real life identity through the device 101. An example of such a verification comprises for example sending a copy of an identification card or passport, accompanied by a picture or video taken of the user to prove their physical presence. Such a verification is per se known in the art and won't be described in more detail. The identity is an information that a user cannot lose (as a hardware token) or forget (as a password).
- The user device 101 requests (S301) a challenge from the given storage device 102x it needs to authenticate with.
- The given storage device generates a challenge.

According to the present embodiment, the challenge comprises a random number (nonce) and a unique identifier of the given storage device 102x. The challenge results from the concatenation (S303) of these two items and is associated with a timestamp which is typically representative of the challenge generation time. The advantages of each of the items have been described above—however, challenges with a partially or fully different content may be devised by the person skilled in the art.

The challenge is encrypted along with the timestamp by the given storage device with a key specific to the given storage device, e.g. a secret symmetric key (S304). The encrypted data is referred to as 'cookie'.

The encrypted challenge and timestamp are sent to the user device 101 along with an unencrypted version of the challenge (S305).

A check (S306) is then carried out by the user device 101 as to whether the storage device ID received in the challenge matches the identifier of the storage device that the challenge was requested from. If the result of the check is negative, the authentication process is aborted. Else, the user device 101 signs (S307) the challenge using its private key and sends (S308) a challenge response message to the given storage device.

According to the present embodiment, the challenge response contains the signed challenge, the cookie and the session ID. The advantages of providing the signed challenge and the cookie in the response have been mentioned earlier. The session ID is used to perform an additional check as described below.

The given storage device decrypts (S309) the cookie using its own key. A check (S310) is performed as to whether the decryption was successful. If the result of the check is negative, a corresponding error message is sent (S311) to the user device, which then ends the authentication process. If the decryption was correctly performed, the given storage device will have obtained the nonce and the timestamp.

The given storage device retrieves (S312) the public key of the user device, using the session ID provided in the response. If no public key is available for that session ID (check at S313), then an error message is sent (S314) to the user device, which then ends the authentication process. In case of a positive check, the public key is used by the given storage device to verify (S315, S316) that the signed challenge it received in the response was indeed signed by the user device 101 the challenge response was received from. If the signature is incorrect, a corresponding error message is sent (S317) to the user device, and the authentication process is ended. Note that in case the signature is incorrect, the initial request for the challenge may have been received from a device other than the user device 101 that locked the authentication session.

A further check (S318, S319) may be carried out as to whether the time elapsed since the timestamp is lower than a threshold value. If the check is negative, a corresponding error message is sent (S320) to the user device 101 and the authentication process is ended.

If the various checks have been successfully passed, the storage device sends a request to the authentication server, stating the session ID. The server returns a result (S322) indicating, based on the session ID, whether an authentication session existed for this session ID and whether or not the user successfully authenticated with the authentication server 103 within this authentication session. If the user successfully authenticated with the authentication server 103, the user is considered as authenticated with the given storage device. If that is not the case, the given storage device sends an error message to the user device, indicating that the authentication failed.

Once the verification phase has been successfully passed for all storage devices, the user is authenticated with all of these devices, with each storage device being sure that no other storage device impersonated the user.

The above authentication process thus allows a single identity verification by a user with an independent authentication server to be shared to authenticate the user with several independent entities that do not necessarily trust each other.

According to a variant embodiment of the authentication process presented above, the challenge generated by a storage device is stored in the storage device's long-term storage along with the session ID and the timestamp. The challenge message sent to the user device 101 in response to a challenge request then does not need to contain an encrypted version of the challenge. Upon receiving the challenge signature from the user device, the challenge is loaded back from storage to verify the validity of the signature.

According to a variant embodiment, the challenge only comprises the nonce. The user device 101 adds the storage device identifier to the random nonce of the challenge before signing. A disadvantage of this variant is however that in case the signature verification fails, it will be more difficult to determine why.

II. Data Storage and Recovery

Figure 4:
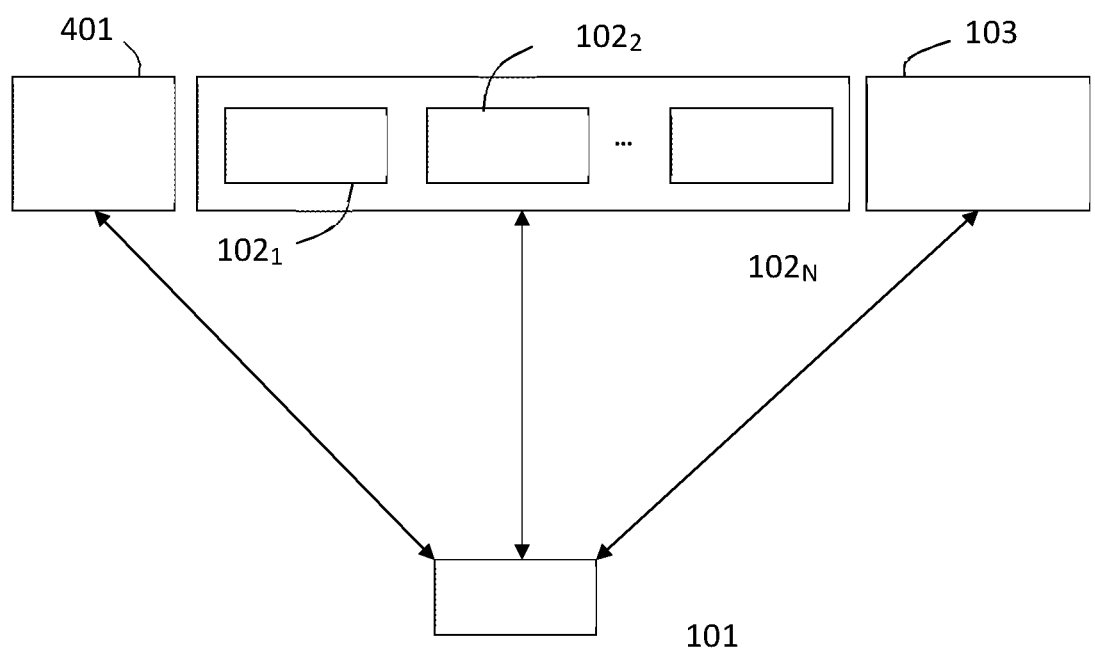
FIG. 4 is a schematic representation of a system for data storage and/or retrieval according to one or more exemplary embodiments.

FIG. 4 is a schematic diagram of a system implementing the data storage and data recovery methods according to one or more embodiments. The system comprises the same devices as FIG. 1 (i.e. a first device 101 also referred to as user device, N second devices 102x with N>=2, also referred to as storage devices and an authentication server 103). The requirements of these devices are the same as already mentioned in conjunction with FIG. 1, i.e. each component of the system is capable of performing cryptographic operations (such as e.g. symmetric and asymmetric encryption, signature and signature verification, random number generation, secure hashing) and possesses network communication functionalities allowing at least communication between the devices shown and as described herein.

The system of FIG. 4 comprises a device 401. The function of device 401 is to authenticate the user and to subsequently provide a key to the user device. This key is used by the user device 101 to encrypt data to be stored in storage devices 102x. Device 401 is for example operated by a service provider. Device 401 is distinct from authentication server 103.

Data storage and recovery are based on a secret sharing method and on a strong multi-factor authentication. The main steps for storing and recovering data include:
Authentication of the user with the device 401.
Authentication of the user with the storage devices according to one or more methods described in section I.
Data storage.
Data retrieval.

Multi-factor authentication is achieved through the authentication with device 401 on one hand, and with each storage device on the other. According to a variant embodiment, one or more of these two authentications are themselves multi-factor authentications.

Data Storage

According to the present exemplary embodiment, data storage comprises, at the user device 101:
Applying a secret sharing method to the data.
The secret sharing method is such that the data is split into N shares, but where only M shares are necessary to recover the data, with $1<=M<=N$. M is referred to as the 'threshold'.
Encrypting each share with a user device key stored by the user device 101.
Authenticating the user with the N storage devices with an authentication method as described in section I.
Storing each encrypted share with a different storage device 102x.

The use of a secret sharing method builds a certain redundancy into the system in the sense that if access by the user device 101 to some encrypted shares becomes impossible, it suffices that M encrypted shares be obtained to recover the initial data.

Encrypting the shares avoids that if M−1 storage devices suffer a data breach and the data becomes public, the remaining storage devices can recover the initial data, using the share that they store themselves. E.g. if M=2, it would suffice that one storage device suffers a data breach for any of the two other storage devices to recover the initial data.

Applying the authentication method previously described has for example the advantage of allowing sharing a single user identity verification in a secure manner with the necessary number of storage devices.

Preferably, the user device 101 obtains the user device key from device 401 following an authentication of the user by the device 401. This prevents the authentication server 103 from being able to access the user device key. The authentication of the user by the device 401 is not critical, e.g. a single authentication factor suffices—if the users lose or forget their authentication factor, this factor can be reset through known means.

Figure 5:
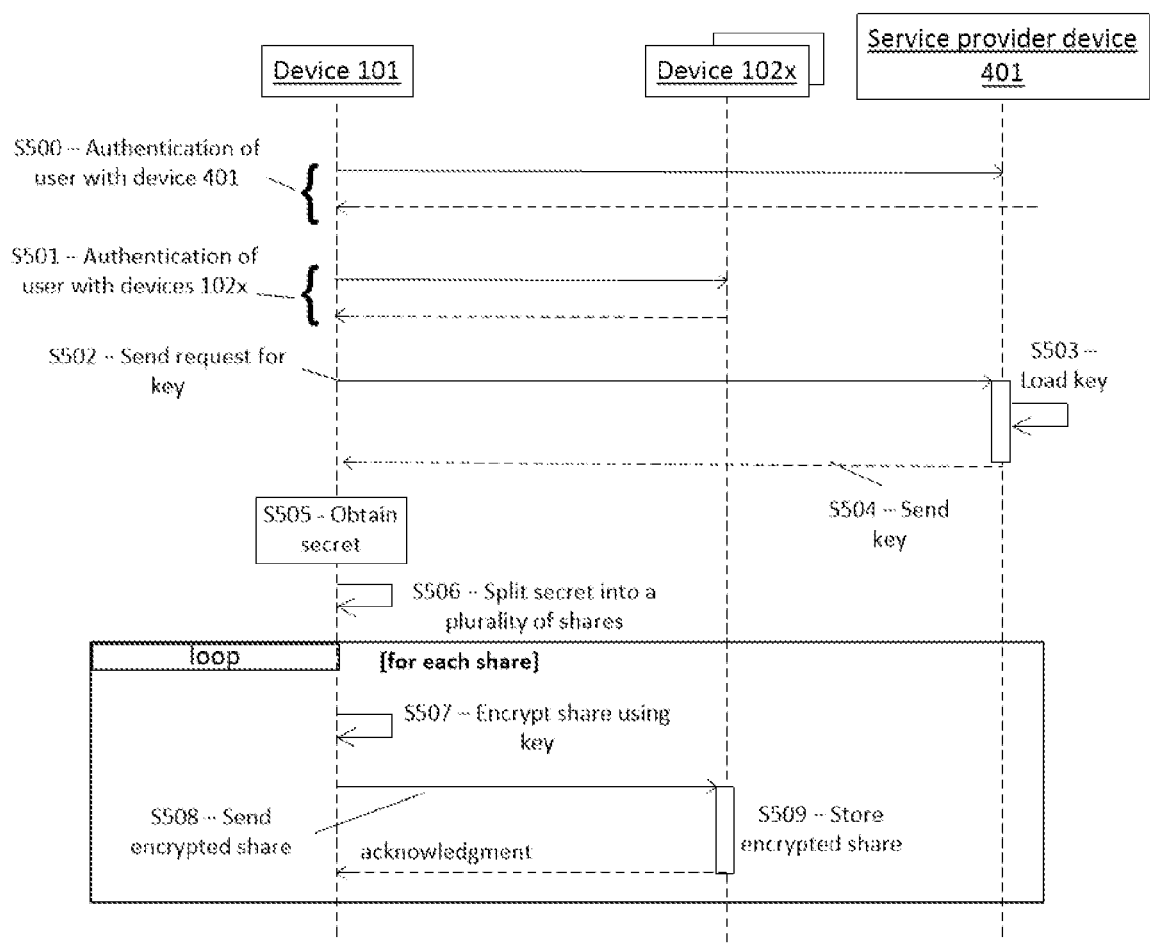
FIG. 5 is a message sequence chart of a data storage method according to one or more exemplary embodiments.

FIG. 5 is a message sequence chart of a data storage method according to one or more embodiments.

At S500, the user authenticates with the service provider device 401. User authentication with the service provider device can be carried out using for example any traditional authentication factor. Authentication can be done directly by the service provider device or through a third-party authentication provider distinct from the authentication server 103. Upon successful authentication, the service provider device 401 provides the user device 101 with a first authentication token used to authenticate all subsequent interactions between the user and the service provider device. The service provider device also provides a second authentication token to the user device 101 and that will allow the user device 101 to interact with the storage devices for performing the authentication method as described in section I.

At S501, the user is authenticated by the storage devices 102x, using:
the second authentication token issued by the service provider device 401;
a verification of the user's physical identity performed by the authentication server 103 and shared with the storage device 102x using the authentication method described in section I.

In order to verify the user's identity, each storage device stores the user's identity (e.g. comprising the user's full name, date and place of birth). This information is obtained from authentication server 103 the first time a storage device authenticates said user through the user device 101. Subsequent interactions of a respective storage device 102x with the same user, e.g. when recovering the stored data, will require a successful identity verification by the respective storage device 102x, based on matching the recorded personal information with personal information obtained during the recovery process.

Following authentication of the user by the service provider device 401, the user device 101 requests from the service provider device 401 (at S502) information enabling the user device 101 to encrypt and decrypt data shares. According to the present embodiment, this information comprises a symmetric key which can be used both for encryption and decryption. In what follows, reference will be made to a symmetric key, without this limiting the disclosure. The service provider device 401 loads the symmetric key from memory (at S503). If no such key is available, the device 401 can generate a key or obtain it otherwise and store it—this step is not shown in FIG. 5. The key is sent to the user device 101 (at S504).

The device 101 then obtains the data ('secret') to be stored (at S505). The secret can for example be data input by the user through the user device's user interface or data generated directly by the user device 101 or data stored by the user device 101 or previously obtained by the user device. In the area of crypto-currencies, the secret can for example comprise one or several crypto-wallet recovery phrases and/or one or several crypto-wallet private keys, as well as potential meta information such as the derivation paths used.

The secret is split into N shares by the user device 101 (at S506), with a threshold of M, $M<=N$, using a secret sharing algorithm. Shamir's Secret Sharing Scheme is an example of such an algorithm, but other sharing algorithms can be used.

Each share is encrypted (at S507) with the user device key. Each encrypted share is sent to a distinct storage device among the N storage devices 102x—i.e. a storage device obtains only a single encrypted share among the N shares. Each storage device stores the encrypted shares in their long-term storage (S508).

Data Recovery

The recovery of the data requires that the user be authenticated with both the device 401 holding the information enabling decryption of the encrypted shares (i.e. the symmetric key in the example above) and with at least M storage devices.

It is to be noted that the user device used to recover the stored data is not necessarily the same as the one that was used to store the data. Purely for the simplicity of the explanation, the description of the present embodiment will however refer to user device 101. Authentication of the user by the storage devices is carried out using authentication server 103 as described in section I. Authentication of the user with device 401 is carried out as described in section II, data storage.

Since data recovery may be performed a long term after data storage, even if storage and recovery are performed using the same user device 101, authentications may need to be performed again.

Data recovery comprises, at the user device 101:
Obtaining the symmetric key from the device 401.
Obtaining encrypted shares from at least M storage devices.
Decrypting M shares using the key.
Applying the reverse secret sharing method to the decrypted shares to recover the data.

Figure 6:
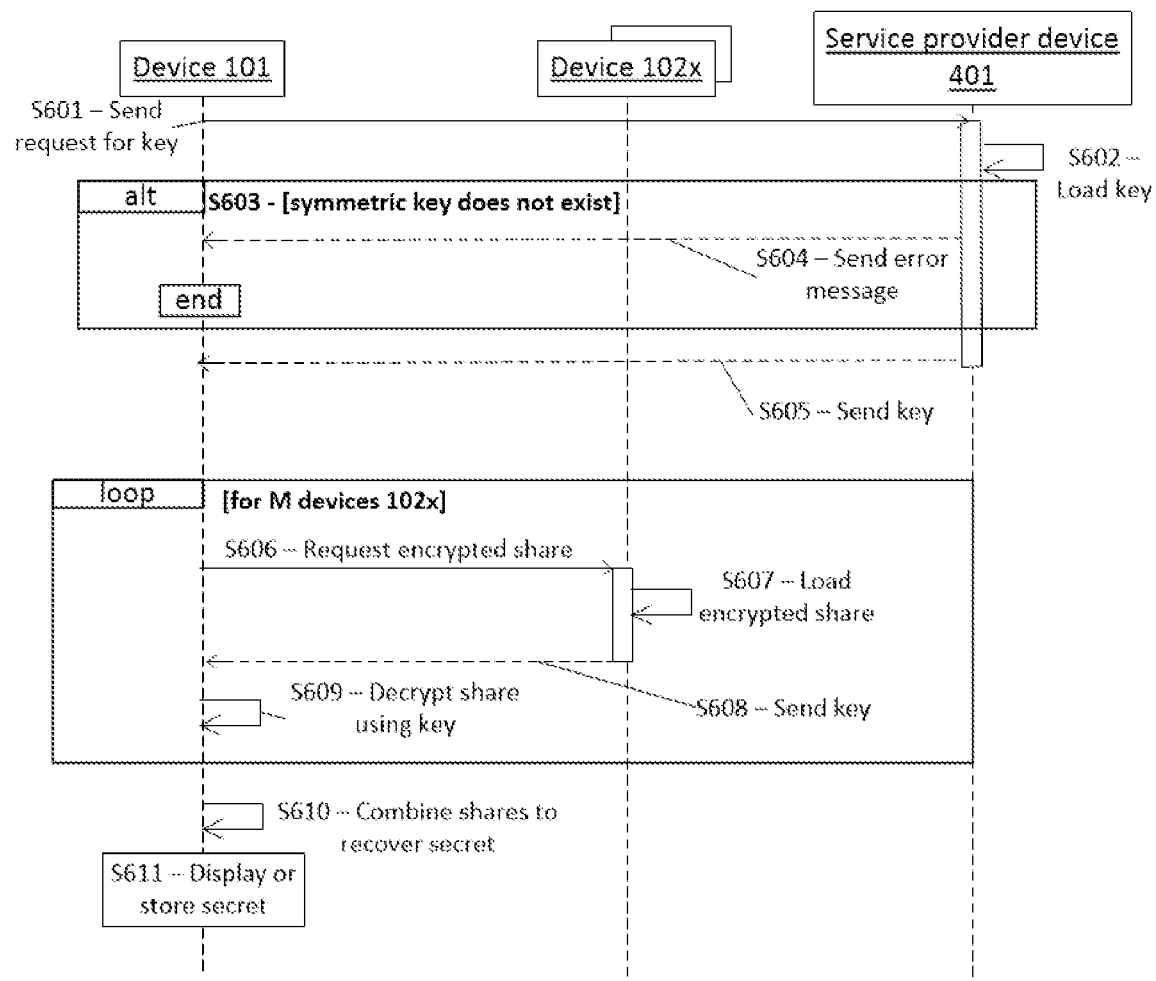
FIG. 6 is a message sequence chart of a stored data retrieval method according to one or more exemplary embodiments.

FIG. 6 is a message sequence chart of a data recovery method according to one or more embodiments. The user device 101 through which data is recovered may be the same device through which the data was stored, or a different device. In both cases, the user device 101 will have authenticated with the storage devices 102x as described in section I.

The user device 101 requests the key from service provider device 401 (S601). The service provider device 401 retrieves the key from its long-term storage (S602). If the key cannot be retrieved for the user device 101, then an error message is sent to the user device 101 (S603, S604), else the key is sent to the user device 101 (S605). The user device 101 then requests an encrypted share from M storage devices (S606). Each storage device then retrieves the encrypted share from memory (S607) and sends it to the user device 101 (S608). Each encrypted share is decrypted by the user device 101 (S609), and the decrypted shares are combined (S610) to recover the data ('secret'). The data may then be used, e.g. displayed or stored for future use (S611).

Figure 7:
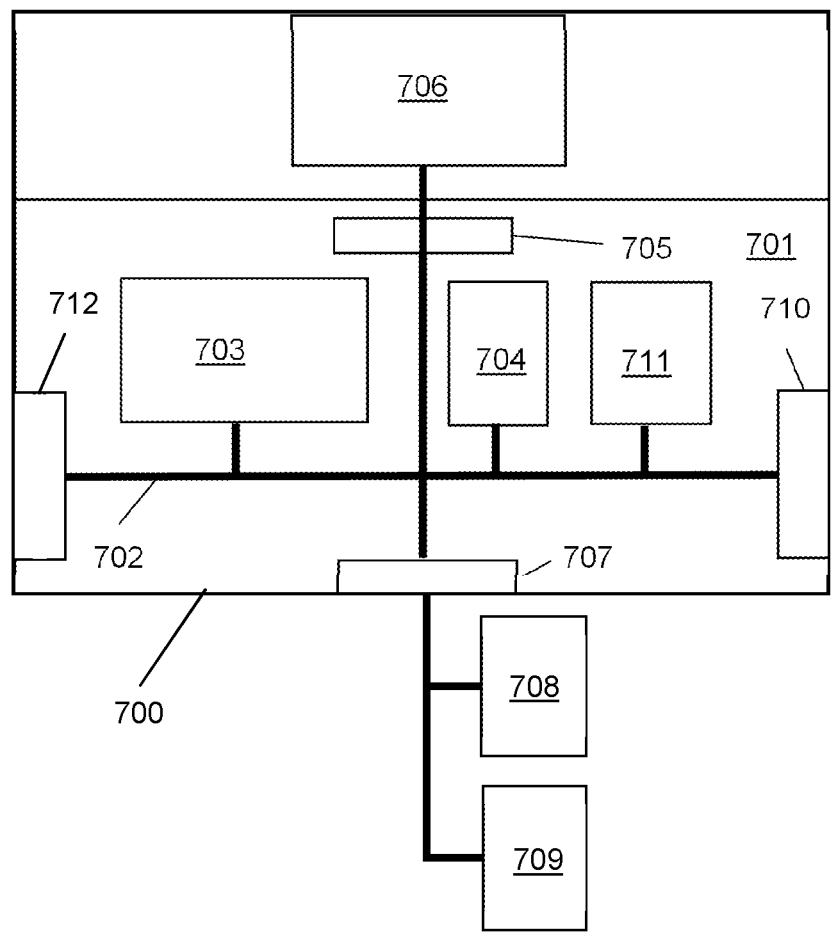
FIG. 7 is a functional block diagram of a generic device that can be used to implement one or more of the devices according to one or more exemplary embodiments.

FIG. 7 is a block diagram of a device 700 that, according to an exemplary embodiment, can be used to implement any one or more of the devices 101 and 102x, and servers 103 and 401 and to carry out partially or fully the methods described herein. The device 700 comprises a printed circuit board 701 on which a communication bus 702 connects a processor 703, a random access memory 704, a storage medium 711, an interface 705 for connecting a display 706, a series of connectors 707 for connecting user interface devices or modules such as a mouse or trackpad 708 and a keyboard 709, a wireless network interface 710 and a wired network interface 712. Depending on the functionality required, the device may implement only part of the above. Certain modules of the device 700 may be internal or connected externally, in which case they do not necessarily form an integral part of the device itself. E.g. display 706 may be a display that is connected to a device only under specific circumstances, or the device may be controlled through another device with a display, i.e. no specific display 706 and interface 705 are then required for device 700. Storage medium 711 contains software code which, when executed by processor 703, causes the device to carry out the methods described herein.

Figure 8:
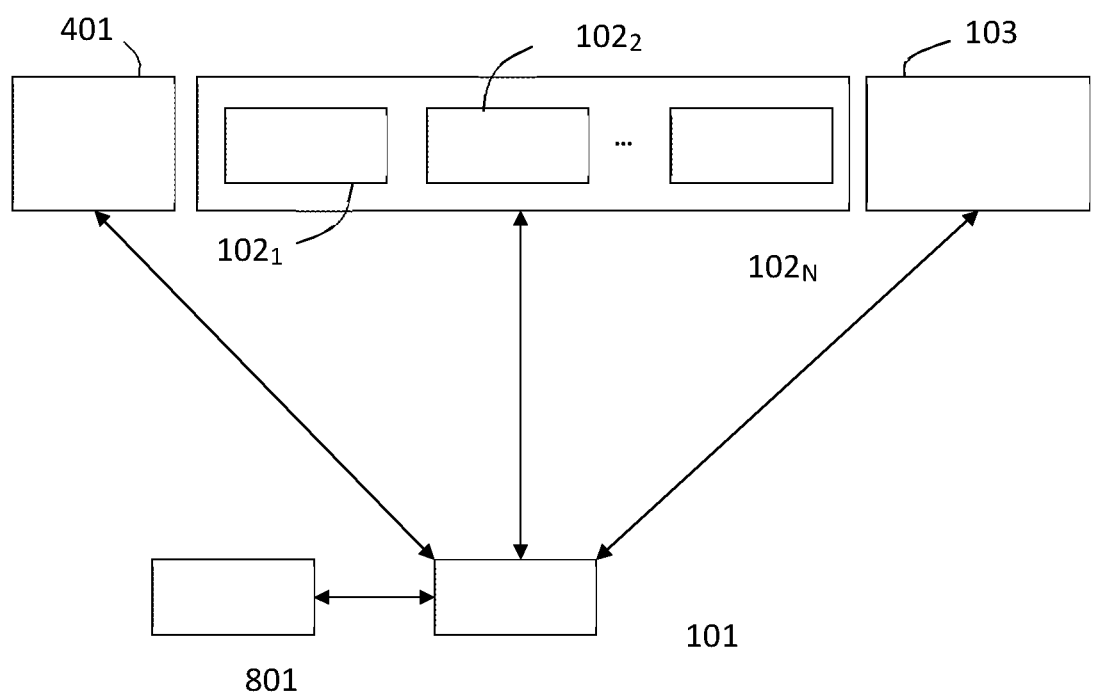
FIG. 8 is a schematic representation of a system according to a variant embodiment.

According to a variant embodiment, the data to be securely stored in the storage devices is initially generated and stored in a hardware device that is not directly connected to the network to which the storage devices are connected. Such a hardware device is preferably easily removable by the user and is for example a 'cold wallet', e.g. a hardware dongle that is not connected to the internet, but that can be physically connected to another device with network connectivity, through an appropriate hardware interface such as a USB interface. FIG. 8 is a schematic diagram of a system with such a device 801 connected to user device 101. Else, the system is similar to that of FIG. 4.

The hardware device 801 can be a device such as device 700, but where the wired and wireless network interfaces are replaced with a connector to interface with user device 101. Hardware device may be a very simple device, but should be able to provide a long term storage capability, support for two-way communication with user device 101 and a processor for carrying out cryptographic operations.

According to the variant embodiment, the hardware device 801 maintains keys called 'transit keys'. The function of these keys is to allow the hardware device to encrypt a message or data and to allow the storage devices to decrypt the message or data, or vice versa. The transit keys can be symmetric or asymmetric and can be any kind of keys allowing to encrypt communications between the hardware device and the storage devices: hardcoded symmetric keys, hardcoded public/private keys, public/private keys with a central certificate authority, etc. . . . . In the example embodiment that follows, it will be assumed that a symmetric key known to the hardware device 801 and all storage devices 102x is used.

Within the present variant embodiment, the hardware device obtains from the user device 101 the key that the user device 101 obtained from the service provider device 401. The data or secret held by the hardware device 801 is split using a secret sharing method, and encrypted by the hardware device using the key obtained from the user device. The resulting encrypted shares are then encrypted a second time using a transit key. The twice-encrypted shares are then sent to the user device. The user device 101 forwards the twice-encrypted shares to the storage devices.

Each storage device obtaining a twice-encrypted share can decrypt it with the transit key before storage.

During data recovery, a storage device from which a share is requested encrypts the share retrieved from memory and encrypts it using the transit key to obtain again a twice-encrypted share. The twice-encrypted share is sent to the user device. The user device 101 forwards the twice-encrypted share to the hardware device.

The hardware device then decrypts the share using the transit key and the user device key. When M shares are decrypted, the data can be reconstructed. It can then be stored or used otherwise.

An advantage of the alternative embodiment is that the data can only be accessed on the hardware device, and not on any other device of the system, in particular not the user device 101.

According to a variant embodiment, the service provider device 401 encrypts the user device key with a transit key to form an encrypted key. The hardware device then obtains from the user device 101 the encrypted key that the user device 101 obtained from the service provider device 401. The encrypted key is then decrypted by the hardware device 801 using the transit key to reconstitute the user device key.

Figure 9:
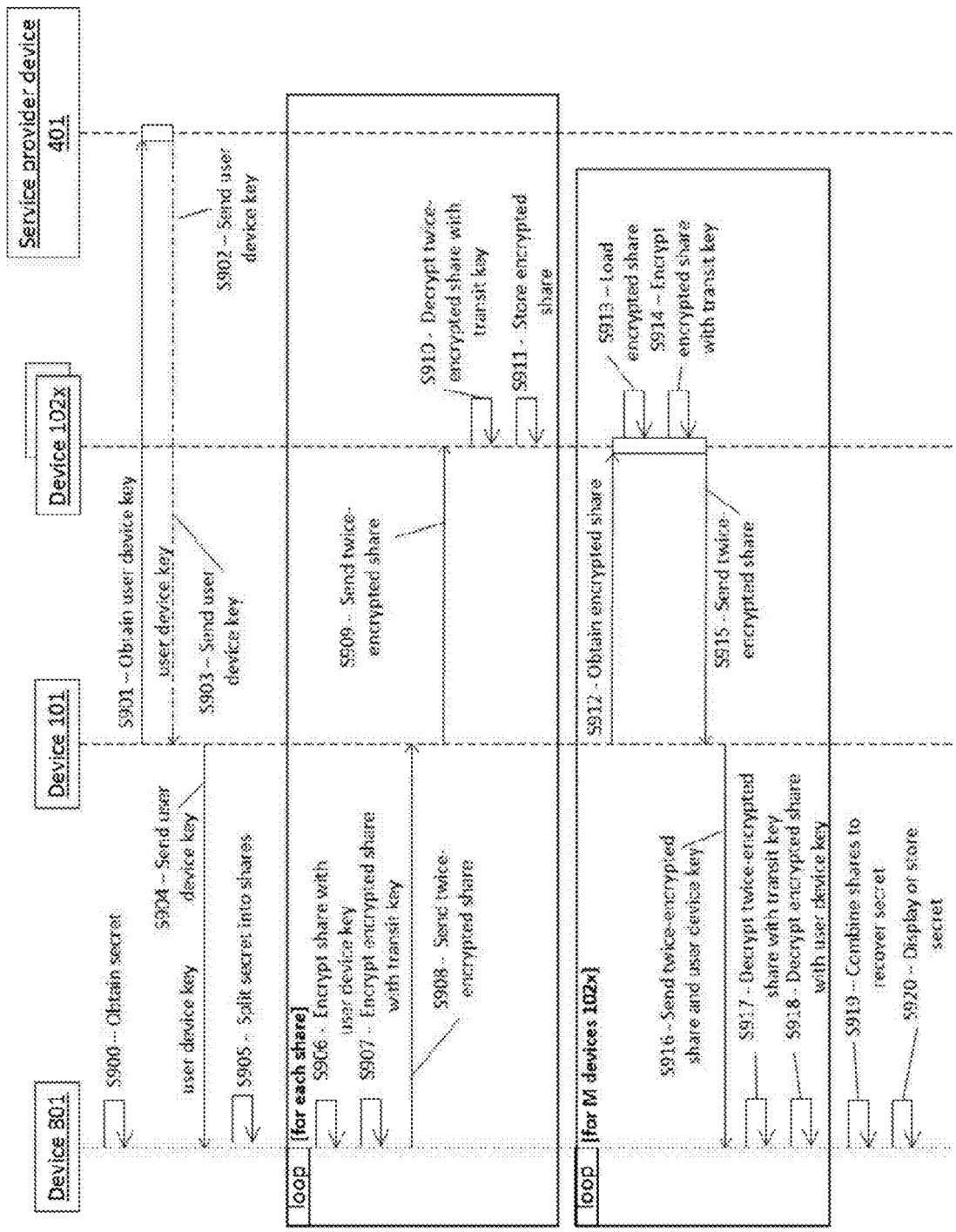
FIG. 9 is a message sequence chart of a data storage and retrieval method according to the variant embodiment.

FIG. 9 is a message sequence chart of a data storage and retrieval method according to the variant embodiment.

Authentication of the user by service provider device 401 and by storage devices 102x is performed as previously described—the corresponding steps are not shown again in FIG. 9.

Device 801 first obtains the data ('secret'), e.g. as previously described in conjunction with the embodiment where this action was carried out by user device 101. As previously, the user device 101 obtains a user device key (e.g. a symmetric key) from service provider device 401 (S901, S902, S903). Device 801 then obtains the user device key from user device 101 (S904) and splits the data to be stored into N shares using e.g. a secret sharing method (S905).

Each share is encrypted by device 801 using the user device key (S905). Each share is further encrypted using the transit key (S907). Each twice-encrypted share is then sent to the user device 101 (S908). The user device 101 sends each twice-encrypted share to a single storage device 102x (S909). A storage device 102x receiving a twice-encrypted share decrypts the share it received using the transit key (S910) and stores the resulting encrypted share (S911). Once all N shares have been processed as above, the storage phase is considered closed.

The data recovery phase can be performed as follows. Authentication is not shown and is performed as previously described. User device 101 first requests encrypted shares from M storage devices 102x (S912). Each of the M storage devices 102x retrieves its encrypted share from memory (S913), encrypts it using the transit key (S914) to form a twice-encrypted share and sends it to the user device 101 (S915). The latter forwards the twice encrypted shares to device 801 (S916), which decrypts each twice-encrypted share using the transit key (S917), decrypts the resulting encrypted shares using the user device key (S918), combines the resulting shares applying the reverse secret sharing method (S919) and then uses (S920) the recovered data as necessary (storage, display . . . ).

The invention claimed is:

1. A method carried out by a first device comprising a processor and memory, said method comprising:
    initiating an authentication session for authenticating a user of the first device with N second devices and with a third device, with N being an integer;
    obtaining an asymmetric key pair comprising a public key and a private key;
    obtaining an identifier for the authentication session from the third device, wherein the identifier is unique to the authentication session;
    transmitting the identifier and the public key to the second devices;
    if a message is received from any second device indicating this second device received, in the past, an identifier identical to the identifier for the authentication session, aborting the authentication session; else receiving first data from the user and carrying out user authentication with the third device based on the first data;
    if user authentication fails, aborting the authentication session; else obtaining a respective challenge from each of the second devices;
    for each challenge, signing the challenge with the private key and sending the signed challenge to the respective second device the challenge was received from; and
    if a message is received from any of the second devices indicating that a challenge failed, aborting the authentication session; else receiving a message indicative of successful user authentication from each second device, indicative of a check by each second device of successful authentication of the user by the third device for the authentication session corresponding to the session identifier.

2. Method according to claim 1, wherein the first data is characteristic of the user's identity and authentication of the user by the third device comprises a check of the user's identity.

3. Method according to claim 1, wherein:
    obtaining a challenge comprises obtaining the challenge unencrypted and encrypted by the respective second device;
    signing the challenge comprises signing the unencrypted challenge; and
    sending the signed challenge also comprises sending the encrypted challenge to the respective second device.

4. Method according to claim 1, wherein each challenge comprises a randomly generated nonce and an identifier of the second device that generated the challenge, method further comprising determining that the identifier in the challenge matches an identifier of the second device that the challenge was requested from, and in the negative, aborting the authentication session.

5. Method according to claim 1, further comprising:
    carrying out user authentication with a fourth device, and in case of successful user authentication, obtaining, from the fourth device, a key enabling encryption of second data.

6. Method according to claim 5, wherein N>=2, further comprising:
    obtaining the second data, wherein the second data is to be stored on the second devices;
    splitting the second data into N shares by carrying out a secret sharing method;
    encrypting each share with the key enabling encryption obtained from the fourth device; and
    sending each of the N encrypted shares to a respective second device for storage.

7. Method according to claim 5, wherein N>=2, further comprising:
    transmitting the key enabling encryption to a fifth device, wherein the fifth device is removably connected to the first device;
    receiving from the fifth device N shares of data encrypted with the key enabling encryption and encrypted with an additional key stored in the fifth device; and
    sending each of the N encrypted shares to a respective second device for storage.

8. Method according to claim 1, further comprising:
    carrying out user authentication with a fourth device, and in case of successful user authentication, obtaining, from the fourth device, a decryption key;
    obtaining M encrypted shares from M second devices, wherein M is an integer, with 1<=M<=N, wherein the shares resulted from the application of a secret sharing method to second data and M shares are sufficient to recover the second data, and wherein the decryption key is adapted to decrypt the M encrypted shares;
    decrypting the M shares; and
    applying a reverse secret sharing method to combine the M decrypted shares to form the second data.

9. Method according to claim 1, further comprising:
    carrying out user authentication with a fourth device, and in case of successful user authentication, obtaining a decryption key from the fourth device;
    transmitting the decryption key to a fifth device, wherein the fifth device is removably connected to the first device;

obtaining from M second devices respective twice encrypted shares of data requiring for decryption both the decryption key and an additional key stored in the fifth device, wherein the shares of data are representative of second data to which a secret sharing method was applied, wherein M is an integer, with 1<=M<=N; and sending the M twice encrypted shares to the fifth device.

10. A device comprising a processor and memory, said memory storing program code, the processor when executing the code causing the device to perform a method according to claim 1.

11. A method carried out by a second device comprising a processor and memory, said method comprising:

receiving an authentication session identifier and a public key from a first device, wherein the session identifier identifies an authentication session of a user of the first device with a third device;

determining the authentication session identifier was previously received, and in the affirmative, sending to the first device a message indicative of the fact that the session identifier was previously received, and in the negative:

storing said session identifier and public key in the memory;

receiving a request for a challenge from the first device;

sending a message containing a challenge in response to the request;

receiving a response to the challenge from the first device and verifying the response, wherein the response contains the challenge signed with a private key of the first device corresponding to the public key and the verification comprises determining that the signature of the challenge was made by the first device using the public key, in the negative, sending to the first device an error message indicative of an incorrect response to the challenge; and when the verification is positive, obtaining, from the third device and as a function of the session identifier, a result of an authentication process of the user by the third device; and in case the result is indicative of a successful authentication of the user by the third device for the authentication session corresponding to the session identifier, considering the user also authenticated by the second device; and sending a message of successful authentication to the first device.

12. Method according to claim 11, comprising:

encrypting the challenge with a secret key of the second device to form encrypted data;

sending the challenge and the encrypted data in the challenge message; and receiving the signed challenge and the encrypted data in the challenge response; wherein the verification comprises:

decrypting the encrypted data; and carrying out the determination that the signature of the challenge was made by the first device based on the signed challenge, the public key and the decrypted challenge.

13. Method according to claim 12, comprising:

generating a timestamp;

encrypting the timestamp with the challenge to form encrypted data;

sending the challenge and the encrypted data; and receiving the signed challenge and the encrypted data in the challenge response; wherein the verification comprises:

decrypting the encrypted data; and determining that the challenge is valid as a function of the timestamp, and if the determination is negative, sending to the first device an error message indicative of an expiration of the challenge.

14. Method according to claim 12, the verification comprising:

determining whether the encrypted data can be decrypted, and in the negative, sending a corresponding error message to the first device.

15. Method according to claim 11, comprising:

receiving an authentication session identifier in the challenge response;

the verification comprising determining whether a public key stored by the second device was received with the session identifier in the challenge response; and in the negative, sending to the first device an error message indicative of an incorrect authentication session identifier.

16. Method according to claim 11, wherein the second device stores the challenge in memory and wherein the verification comprises determining that the signature of the challenge was made by the first device based on the signed challenge, the public key and the stored challenge.

17. Method according to claim 11, wherein obtaining the result of the authentication comprises obtaining data characteristic of a user's identity.

18. Method according to claim 11, wherein the challenge comprises a randomly generated nonce and a unique identifier of the second device.

19. A device comprising a processor and memory, said memory storing program code, the processor when executing the code causing the device to perform a method according to claim 11.

20. A non-transitory computer readable medium comprising program instructions stored thereon for performing the method according to claim 1.

21. A non-transitory computer readable medium comprising program instructions stored thereon for performing the method according to claim 11.

* * * * *